US011034309B2

(12) United States Patent
Chow

(10) Patent No.: US 11,034,309 B2
(45) Date of Patent: *Jun. 15, 2021

(54) HEAVY DUTY MAGNET MOUNT

(71) Applicant: Bracketron, Inc., Edina, MN (US)

(72) Inventor: Andrew Chow, Hugo, MN (US)

(73) Assignee: Bracketron, Inc., Edina, MN (US)

( * ) Notice: Subject to any disclaimer, the term of this patent is extended or adjusted under 35 U.S.C. 154(b) by 88 days.

This patent is subject to a terminal disclaimer.

(21) Appl. No.: 15/843,464

(22) Filed: Dec. 15, 2017

(65) Prior Publication Data

US 2018/0126920 A1 May 10, 2018

Related U.S. Application Data

(63) Continuation of application No. 14/805,657, filed on Jul. 22, 2015, now Pat. No. 9,845,058.

(60) Provisional application No. 62/027,856, filed on Jul. 23, 2014.

(51) Int. Cl.

| F16M 13/00 | (2006.01) |
|---|---|
| B60R 11/02 | (2006.01) |
| F16M 11/24 | (2006.01) |
| H04M 1/04 | (2006.01) |
| F16M 11/14 | (2006.01) |
| F16M 13/02 | (2006.01) |
| F16M 11/04 | (2006.01) |
| B60R 11/00 | (2006.01) |

(52) U.S. Cl.
CPC ........... *B60R 11/02* (2013.01); *F16M 11/041* (2013.01); *F16M 11/14* (2013.01); *F16M 13/00* (2013.01); *F16M 13/022* (2013.01); *H04M 1/04* (2013.01); *B60R 2011/007* (2013.01); *B60R 2011/0075* (2013.01); *B60R 2011/0089* (2013.01); *F16M 11/24* (2013.01)

(58) Field of Classification Search
CPC ... B60R 11/02; B60R 13/0206; B60R 13/007; H04M 1/04; F16M 13/00; F16M 11/24
USPC ... 248/121, 125.8, 206.5, 286.1, 188.5, 161, 248/292.12, 309.1, 917; D14/447
See application file for complete search history.

(56) References Cited

U.S. PATENT DOCUMENTS

| 5,779,205 A | 7/1998 | Ching |
|---|---|---|
| 6,888,940 B1 | 5/2005 | Deppen |
| D544,493 S | 6/2007 | Lam et al. |
| D549,709 S | 8/2007 | Richter |
| D560,116 S | 1/2008 | Brassard |

(Continued)

FOREIGN PATENT DOCUMENTS

| CN | 202863290 U | 4/2013 |
|---|---|---|
| CN | 203057252 U | 7/2013 |

(Continued)

*Primary Examiner* — Tan Le
(74) *Attorney, Agent, or Firm* — Westman, Champlin & Koehler, P.A.

(57) ABSTRACT

A mount for an electronic device includes a ferromagnetic element securable to the electronic device, and a mount body including a face plate and at least one leg, the magnet secured in the face plate, and the at least one leg movable from a stored position to a support position. The stored position is flush with the face plate, and the support position is normal to the face plate. The magnet and ferromagnetic element combine with the leg in it support position to allow reliable mounting of heavy and/or oversized electronic devices.

9 Claims, 9 Drawing Sheets

(56) References Cited

U.S. PATENT DOCUMENTS

| | | | | |
|---|---|---|---|---|
| 7,431,251 | B2* | 10/2008 | Carnevali | F16M 13/00 224/183 |
| 7,922,135 | B2* | 4/2011 | Granata | B60R 13/0206 248/206.5 |
| D645,462 | S | 9/2011 | Choi | |
| D665,797 | S | 8/2012 | Novak | |
| D673,555 | S | 1/2013 | Sanlaville | |
| D683,724 | S | 6/2013 | Wada | |
| 8,706,175 | B2* | 4/2014 | Cho | F16M 11/041 248/205.1 |
| 8,857,687 | B1* | 10/2014 | An | B60R 11/02 224/282 |
| 9,573,531 | B2* | 2/2017 | Zhang | B60R 11/02 |
| 9,845,058 | B2* | 12/2017 | Chow | B60R 11/02 |
| 2011/0192857 | A1 | 8/2011 | Rothbaum et al. | |
| 2012/0252543 | A1* | 10/2012 | Cho | F16M 11/041 455/575.8 |
| 2014/0191096 | A1* | 7/2014 | Wiercinski | F16M 11/14 248/206.5 |
| 2014/0268622 | A1* | 9/2014 | Chao | B60R 11/02 361/809 |
| 2015/0048233 | A1* | 2/2015 | Dumas | F16M 11/32 248/550 |

FOREIGN PATENT DOCUMENTS

| | | |
|---|---|---|
| KR | 100541189 B1 | 1/2006 |
| KR | 100625699 B1 | 9/2006 |

* cited by examiner

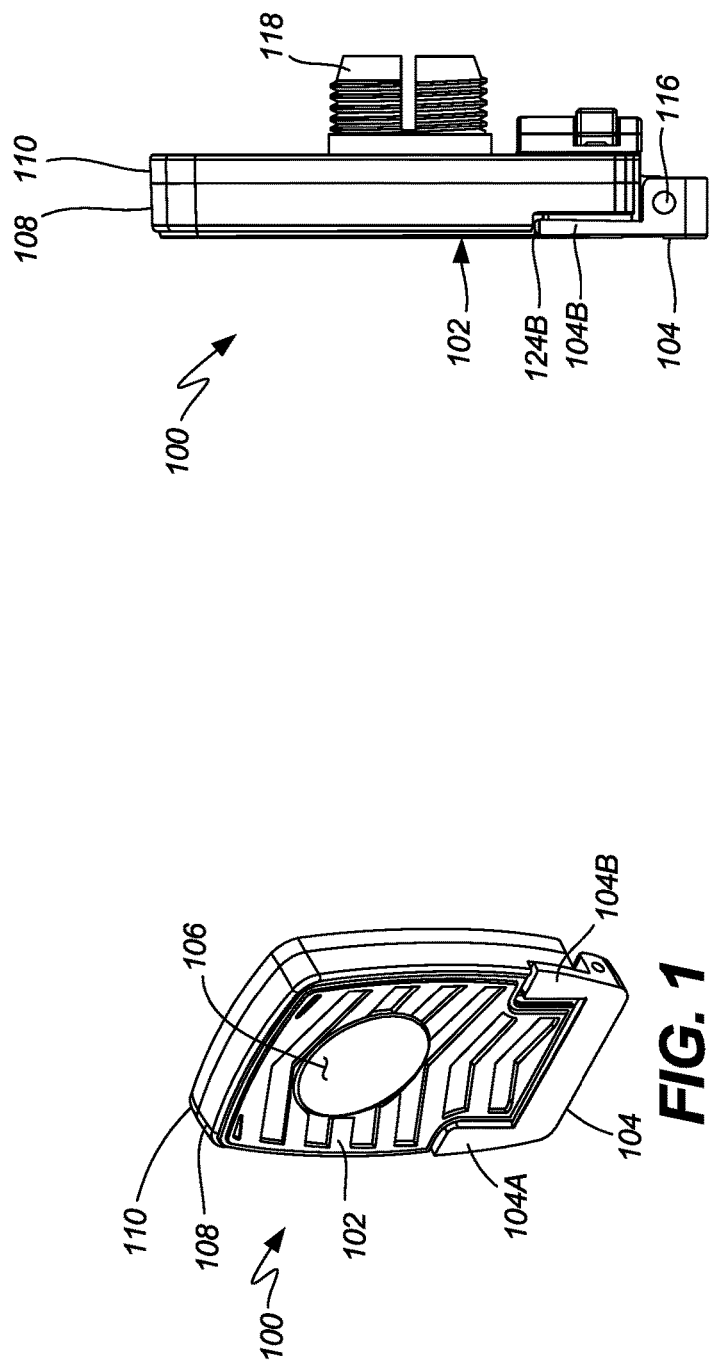

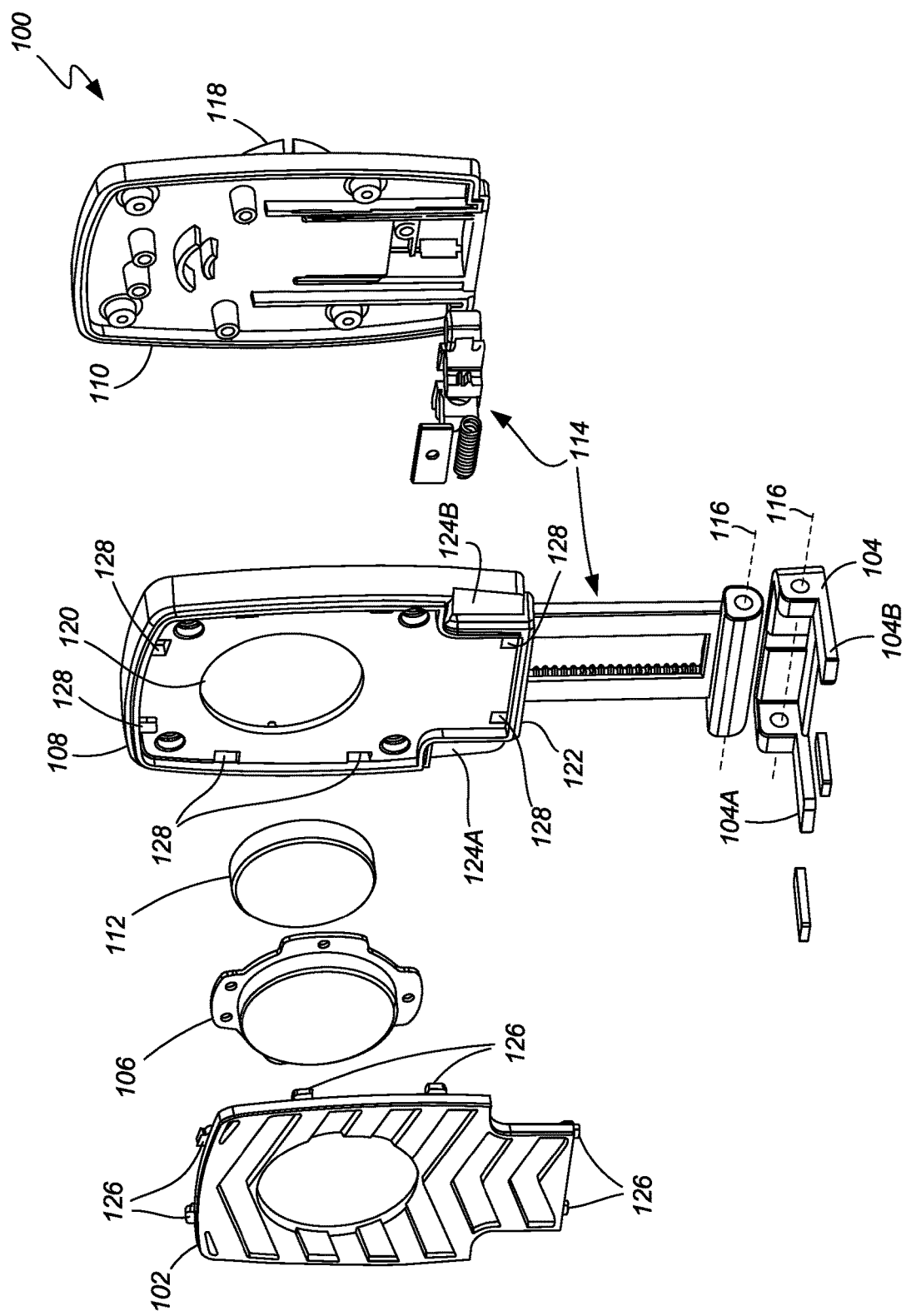

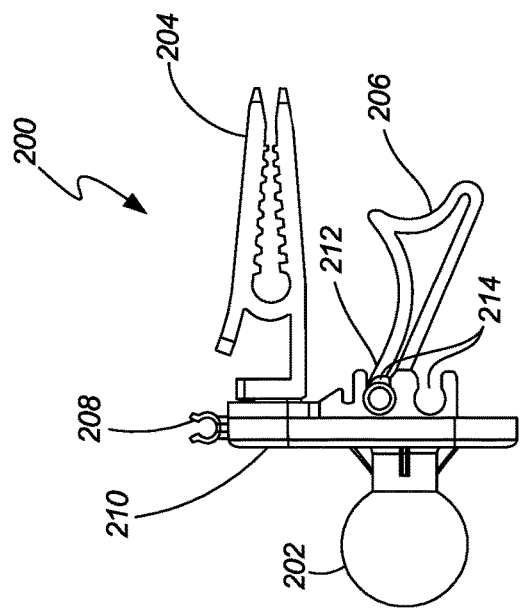
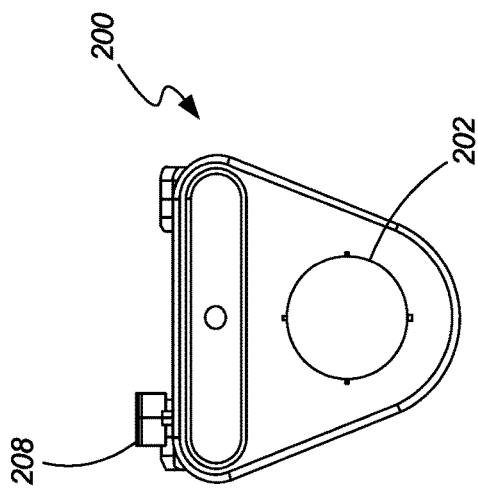
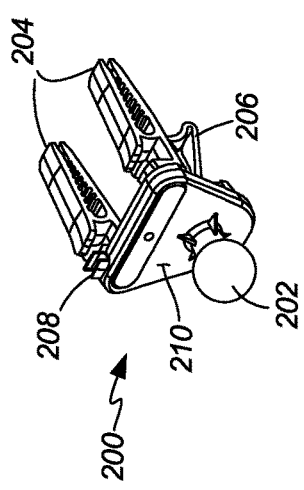
FIG. 5  FIG. 6  FIG. 7  FIG. 8

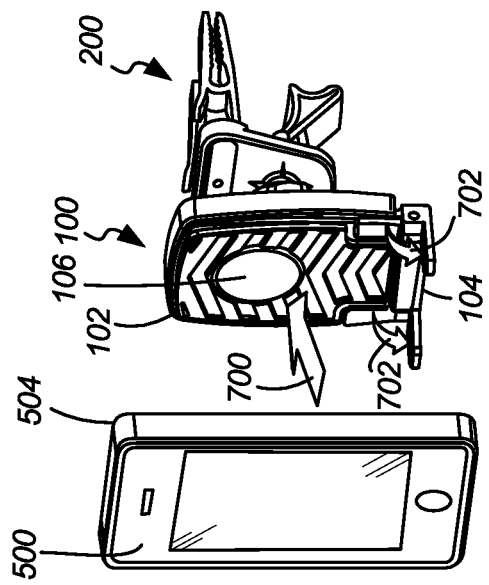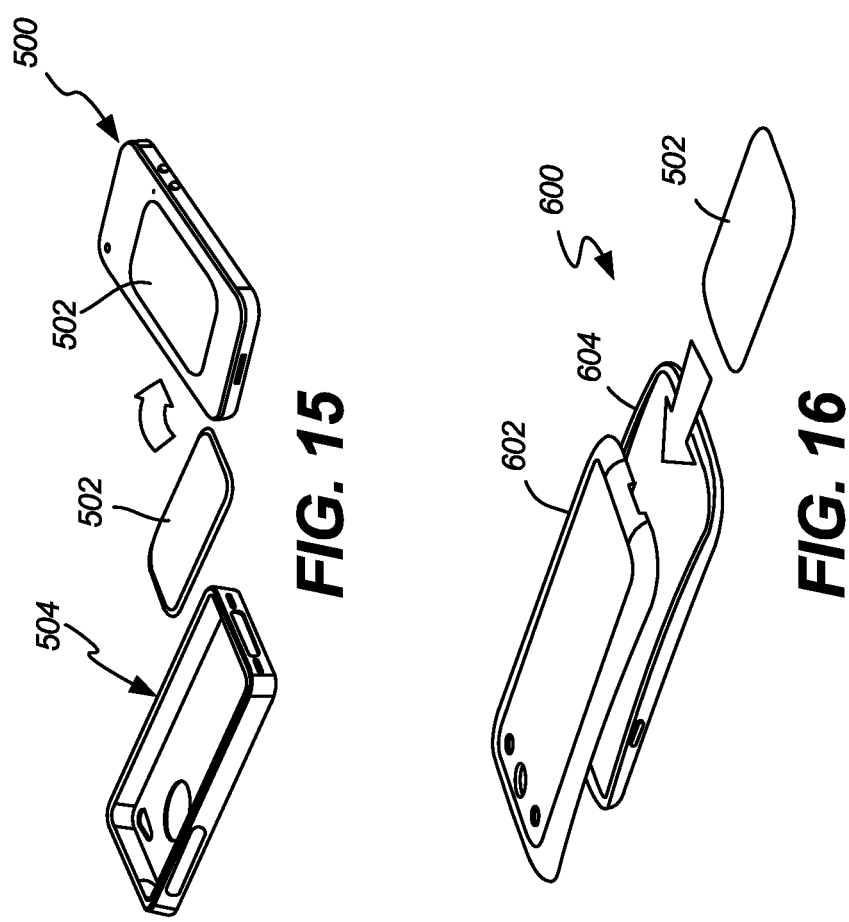

HEAVY DUTY MAGNET MOUNT

CROSS REFERENCE TO RELATED APPLICATION

This application is a continuation of U.S. application Ser. No. 14/805,657, filed Jul. 22, 2015, which claims the benefit of U.S. Provisional Application No. 62/027,856, filed on Jul. 23, 2014, hereby incorporated herein in its entirety by reference.

BACKGROUND

Disclosed is a magnetic mount for an electronic device, such as a cellular/portable telephone, tablet, book reader, GPS, or the like.

Mounts for electronic devices are known. Some mounts use magnets within the mount, and a separate ferromagnetic plate or other element that attaches to an external part of the electronic device, for example, the back of the device. When the device is placed in the vicinity of the mount with the ferromagnetic plate facing the magnet, the magnetic field of the magnet attracts the ferromagnetic plate and the device attached to the ferromagnetic plate is held to the magnet, and therefore to the mount.

Alternatively, some mounts for electronic devices use cradles that may include side supports and bottom supports, so that the device may be rested on or in fact clamped or otherwise held to the mount by some combination of support arms or legs.

Mounts such as those described above have disadvantages. For example, with the increasing size and weight of electronic devices, cradle style mounts may not have sufficient clamping ability to maintain an electronic device on or in the mount, such as during cornering, acceleration, or deceleration of a vehicle in which the mount is used, or such as on rough roads or other terrain where the vehicle may bounce or lurch.

Similarly, a magnet and a ferromagnetic plate alone may not be enough to maintain an electronic device on the mount. Still further, magnetic style mounts place a ferromagnetic plate on an exterior of the device, and to use the device without the mount, the ferromagnetic plate is exposed. Users typically do not wish to have an exposed ferromagnetic plate, which many consider to be distracting or unsightly. Also, many users of electronic devices such as those described use cases or other coverings for their electronic devices, and do not wish to place a ferromagnetic plate on those cases or coverings, either.

SUMMARY

In one aspect of the present disclosure, a mount for an electronic device includes a ferromagnetic element securable to the electronic device, a mount body. The mount body includes a face plate and at least one leg, the magnet secured in the face plate, and the at least one leg movable from a stored position to a support position.

In another aspect of the present disclosure, amount for an electronic device includes a mount body having a housing having a face, a magnet disposed within the housing, and at least one leg extension movable between a stored position and a support position.

In another aspect of the present disclosure, a mount for an electronic device includes a housing having a front plate and a back plate coupled together, a mount face coupled to the front plate, the mount face having an opening therein, a magnet in the housing, positioned in the opening of the mount face, and an extendible, foldable leg coupled to and extendible from the housing, wherein the leg is extendible substantially parallel to the mount face, and foldable at a distal position to the housing from a first position substantially coplanar with the mount face to a second position substantially perpendicular to the mount face.

In another aspect of the present disclosure, a method of mounting an electronic device to a mount body includes mounting a ferromagnetic element to or within the electronic device to assist in removably retaining the electronic device to a mount body, providing a mount body having a magnet and adjustable legs movable from a stored position to a support position, and removably retaining the electronic device to the mount body using the magnet and ferromagnetic element, and/or the adjustable legs.

Other aspects of the present disclosure may be combined with one or more of the preceding aspects, and include magnet being covered by a magnet cover; the magnet, magnet cover, and legs being positioned and/or mounted within a mount body case; the legs being adjustably extendible from the mount body; a ferromagnetic element mountable to the electronic device; the extendible, foldable leg including a pair of leg extensions rotatably mounted to the leg, the pair of leg extensions rotatable between the first position and the second position; and the extendible, foldable leg including a leg body extendible from the housing substantially coplanar to the mount face, and a leg extension rotatably coupled to the leg body, the leg extension rotatable from the first position and the second position.

BRIEF DESCRIPTION OF DRAWINGS

FIG. 1 is a perspective view of a mount body for an electronic device;

FIG. 2 is a side elevation view of the mount body of FIG. 1;

FIG. 3 is a top view of the mount body of FIG. 1;

FIG. 4 is an exploded perspective view of the mount of FIG. 1;

FIG. 5 is a perspective view of a vent base for the mount of FIG. 1;

FIG. 6 is a side elevation view of the vent base of FIG. 5;

FIG. 7 is a top view of the vent base of FIG. 5;

FIG. 8 is a front elevation view of the vent base of FIG. 5;

FIG. 15 is a view of an electronic device with a ferromagnetic plate and an optional case;

FIG. 16 is a perspective view of a ferromagnetic plate placement inside a cover of an electronic device;

FIG. 17 is a perspective view of a mount body and vent base secured to a vent;

DETAILED DESCRIPTION

Figure 9:
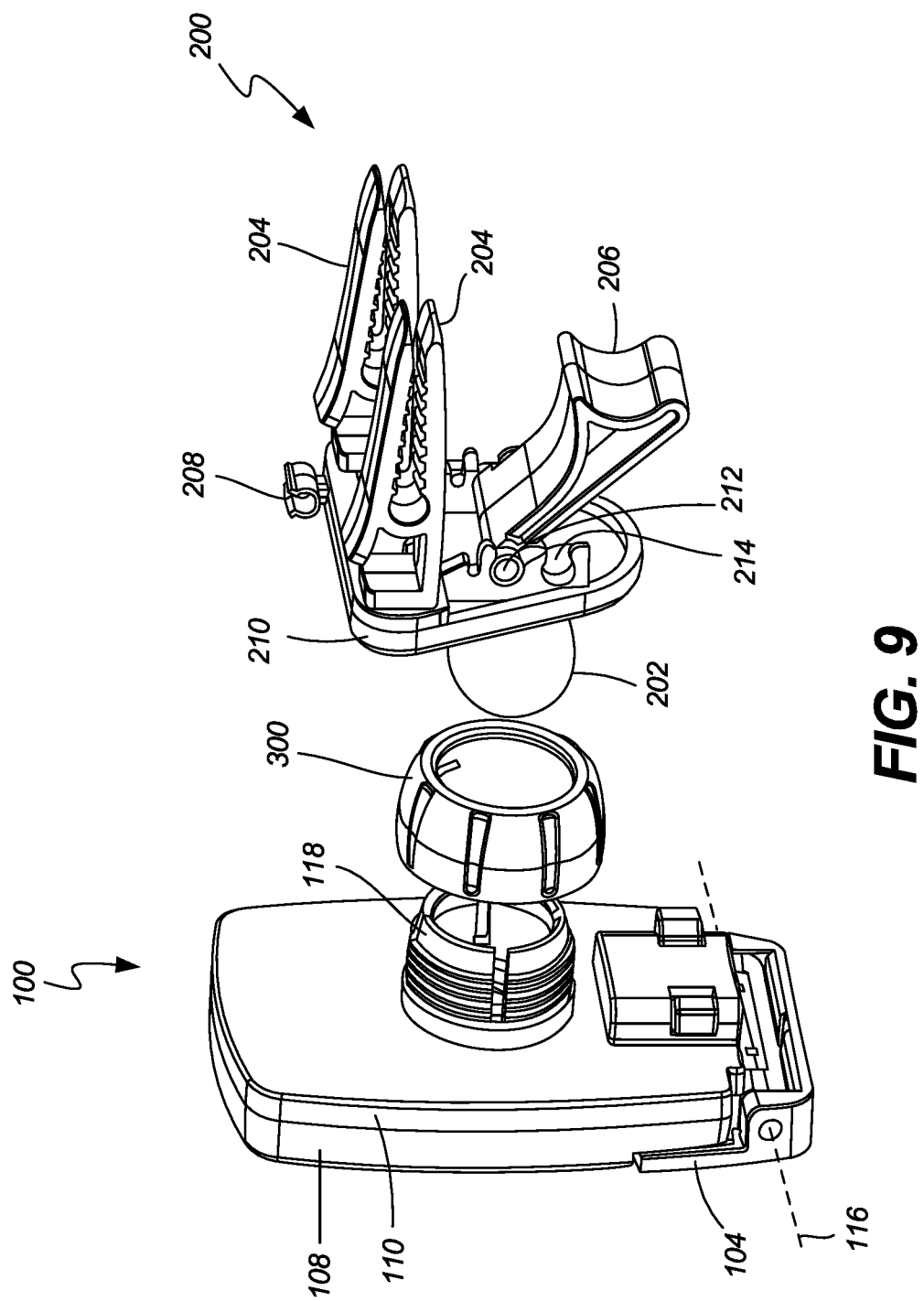
FIG. 9 is a perspective view of a mount body such as the mount of FIG. 1 and its connection to a vent base.
Figure 11:
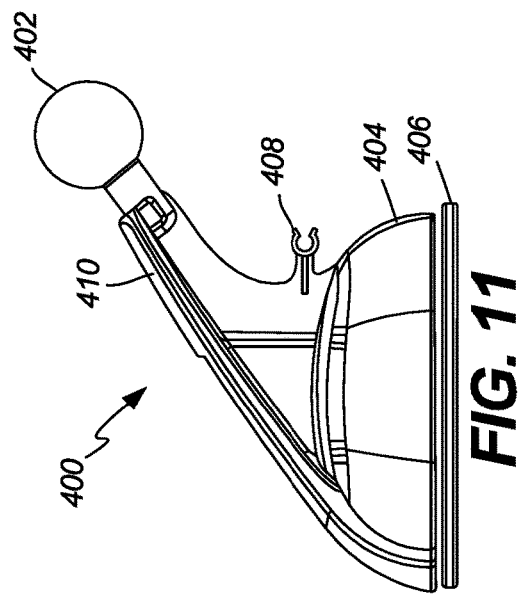
FIG. 11 is a side elevation view of the dash base of FIG. 10.
Figure 13:
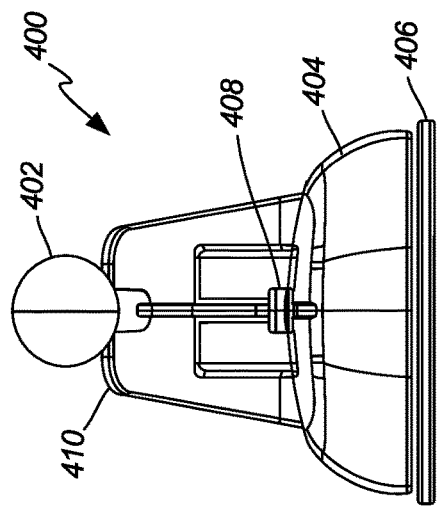
FIG. 13 is a front elevation view of the dash base of FIG. 10.
Figure 10:
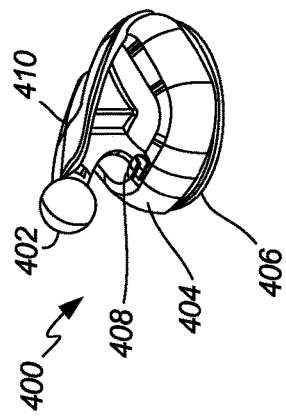
FIG. 10 is a perspective view of a dash base.
Figure 12:
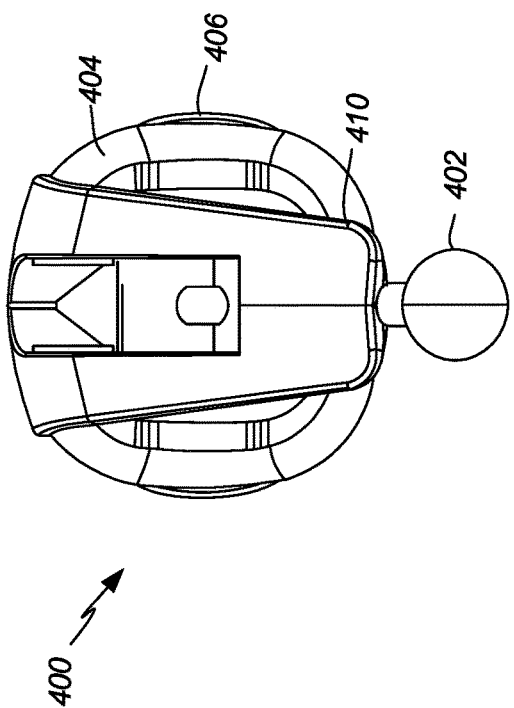
FIG. 12 is a top view of the dash base of FIG. 10.

Embodiments of the present disclosure provide a mount for an electronic device with a hidden ferromagnetic element, a magnetic base, and foldable, optional legs for further support.

Static magnetic field strength decreases roughly exponentially as a function of distance from a magnet. Magnetic fields are affected by interfering objects and/or material between the magnet and a ferromagnetic element. Because of this, placement of ferromagnetic plates inside electronic devices, such as inside a back cover of a device, or between a device and a case, can severely decrease the effectiveness of magnetic mounts.

Referring to FIGS. 1-4, a mount body 100 for mounting an electronic device thereto is shown. An electronic device can include, by way of example only and not by way of limitation, a portable telephone, such as a cellular or satellite telephone, a tablet, music player, book reader, global positioning satellite (GPS) device, or the like. Mount body 100 has a mount face (or face plate) 102, legs 104, a magnet cover 106, and further comprises a front plate 108 and a back plate 110 that may be removably or permanently fastened together by any number of fasteners or fastening methods, including, by way of example only and not by way of limitation, screws, nuts and bolts, glue, snap-fittings, or the like. Legs 104 in one embodiment are rotatably mounted to front plate 108, to pivot about an axis identified at line 116. Legs 104 are shown as a single leg with two leg extensions in FIG. 4. It should be understood that legs 104 may comprise a single molded piece with two leg extensions, or alternatively, individually rotatable leg extensions 104A and 104B. A socket 118 is formed with or attached to back plate 110, for receiving a ball of a base (described later herein).

Figure 18:
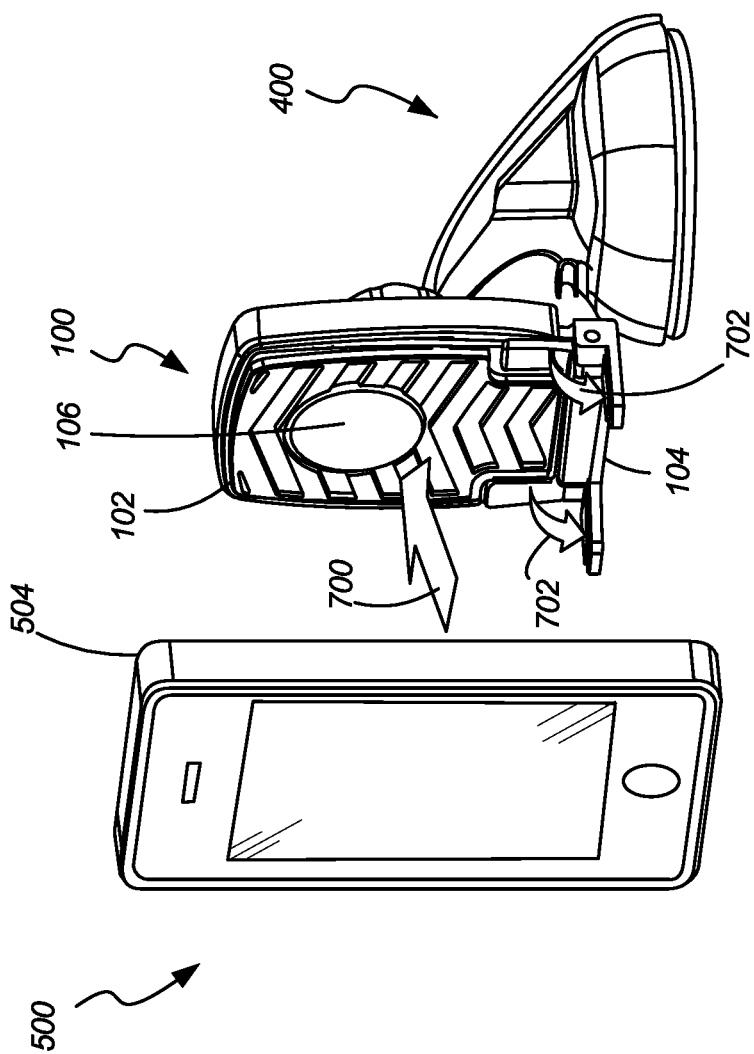
FIG. 18 is a perspective view of a mount body and dash base.
Figure 19:
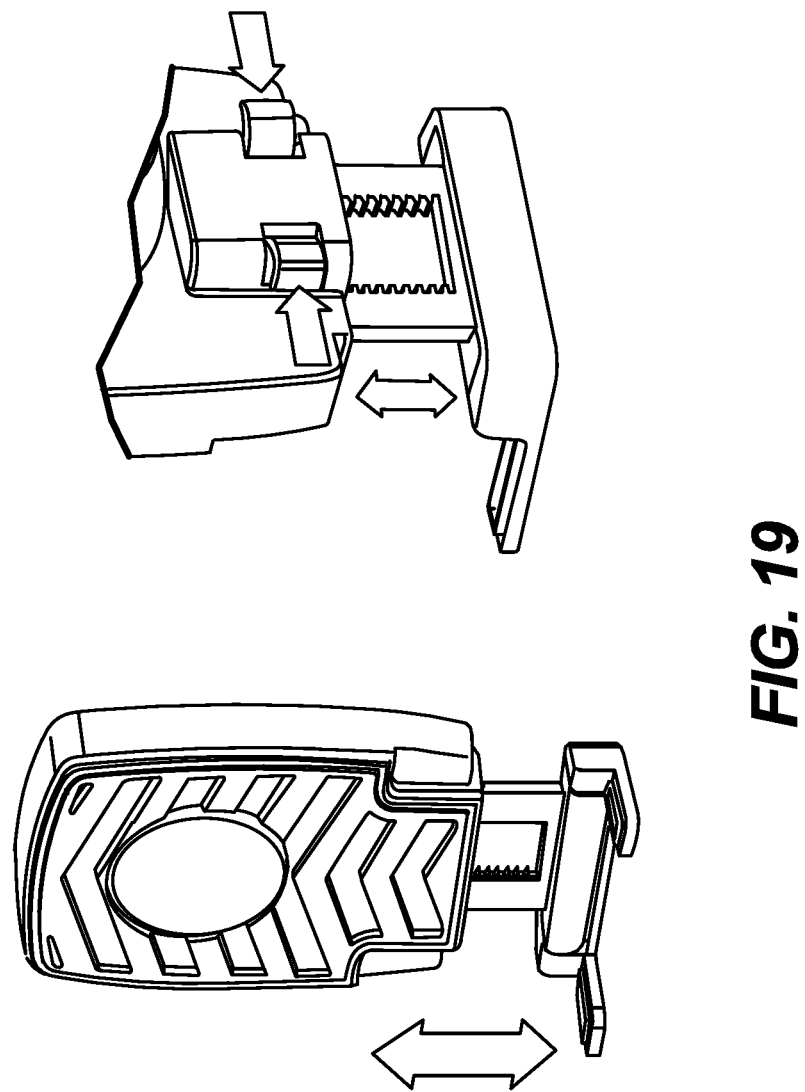
FIG. 19 is a perspective view of a mount body with legs in their supporting position and extended.

Referring specifically to FIG. 4, an exploded view of a mount body 100 is shown. Legs 104 are shown in FIG. 4 as extendible from a bottom 122 of front plate 108. Legs 104 are rotatable from a stored position as shown in FIG. 1, where individual legs 104A and 104B, in one embodiment formed in a unitary body rotatable together, but in another embodiment individually rotatable, are rotatable to a supporting position as shown in FIGS. 4, 17, and 18. In the stored position, individual legs 104A and 104B fold flush to front plate 108 into openings 124A and 124B, respectively, and are in the stored position substantially coplanar with the face plate 102. In the support position, the legs extend substantially normal to the face plate 102.

A leg extension assembly (or leg base) 114 allows for the extension of legs 104 as is shown in FIG. 4. Leg extension assembly 114 is known in the art and will not be described further herein.

Mount body 100 includes a magnet, in one embodiment a rare earth magnet, 112, which is disposed at least partially in opening 120 of front plate 108, and secured therein by magnet cover 106 and suitable fasteners and/or guides on one or both of front plate 108 and back plate 110. Mount face 102 is secured to front plate 108, such as by tabs 126 that engage corresponding slots 128 in front plate 108, or by other suitable mechanisms that will be apparent to one of skill in the art, without departing from the scope of the disclosure.

Referring now to FIGS. 5-8, a vent base 200 is shown. Vent base 200 comprises, in one embodiment, a ball 202 for engaging a socket such as socket 118 of mount body 100, at least one clip 204 for removable attachment of the vent base 200 to a vent such as an air vent of a vehicle, and a brace 206 for support of the vent base when the clip 204 is removably attached to a vent. As shown in FIGS. 5-8, two clips 204 are used, although more or fewer clips 204 may be used without departing from the scope of the disclosure. Ball 202 and clip(s) 204 extend from a vent base body 210, in one embodiment on opposite sides thereof. A cord management clip 208, for temporary restraint of a cord such as a cord of an electronic device placed on the mount body 100, is provided at a top of the vent base body 210, although other placements of a cord management clip, including on the mount body, are contemplated without departing from the scope of the disclosure.

Brace 206 is, in one embodiment, rotatably mounted to vent base body 210 using an axle 212 that snap fits into fastening clips 214 of vent base body 210. Multiple fastening clips 214 are provided in one embodiment. While the orientation of clips 204 and brace 206 are shown substantially horizontally in FIGS. 5-8, it should be understood that the clips 204 and brace 206 may, in other embodiments, be oriented substantially perpendicular to the orientation shown, so as to be mountable in a vent with a different orientation of slats or openings. Further, clips 204 and brace 206 may be oriented perpendicular to one another, and in some embodiments, fastening clips 214 may be provided on one vent base body 210 that are substantially perpendicular to one another, to allow modular orientation of the brace 206.

FIG. 9 shows an assembly of a mount body 100 to a vent base 200, in which ball 202 of vent base 200 engages socket 118 of mount body 100, allowing a secure yet movable connection between the mount body 100 and the vent base 200. A threaded cap 300 engages threads on the socket 118 to more securely mount mount body 100 to vent base 200.

Referring now to FIGS. 10-13, a dash base 400 is shown. Dash base 400 may be used to mount to a dashboard of a vehicle, or to another smooth surface such as a window or windshield, or the like. Dash base 400 comprises, in one embodiment a ball 402 for engaging a socket such as socket 118 of mount body 100, a dash base body 404, and a suction pad 406. A suction/vacuum mounting assembly (not shown) allows removable mounting of the dash base 400. Such an assembly is known in the art, and will not be described further herein, except to note that any suction type mounting system is amenable to use with the embodiments of the present disclosure without departing from the scope of the disclosure.

Ball 402 extends in one embodiment on a ball mount extension 410. Ball mount extension 410 also includes, in one embodiment, a cord management clip 408, for temporary restraint of a cord such as a cord of an electronic device placed on the mount body 100. Cord management clip 408 is shown at a bottom of the ball mount extension 410, although other placements of a cord management clip, including on the mount body, are contemplated without departing from the scope of the disclosure.

Figure 14:
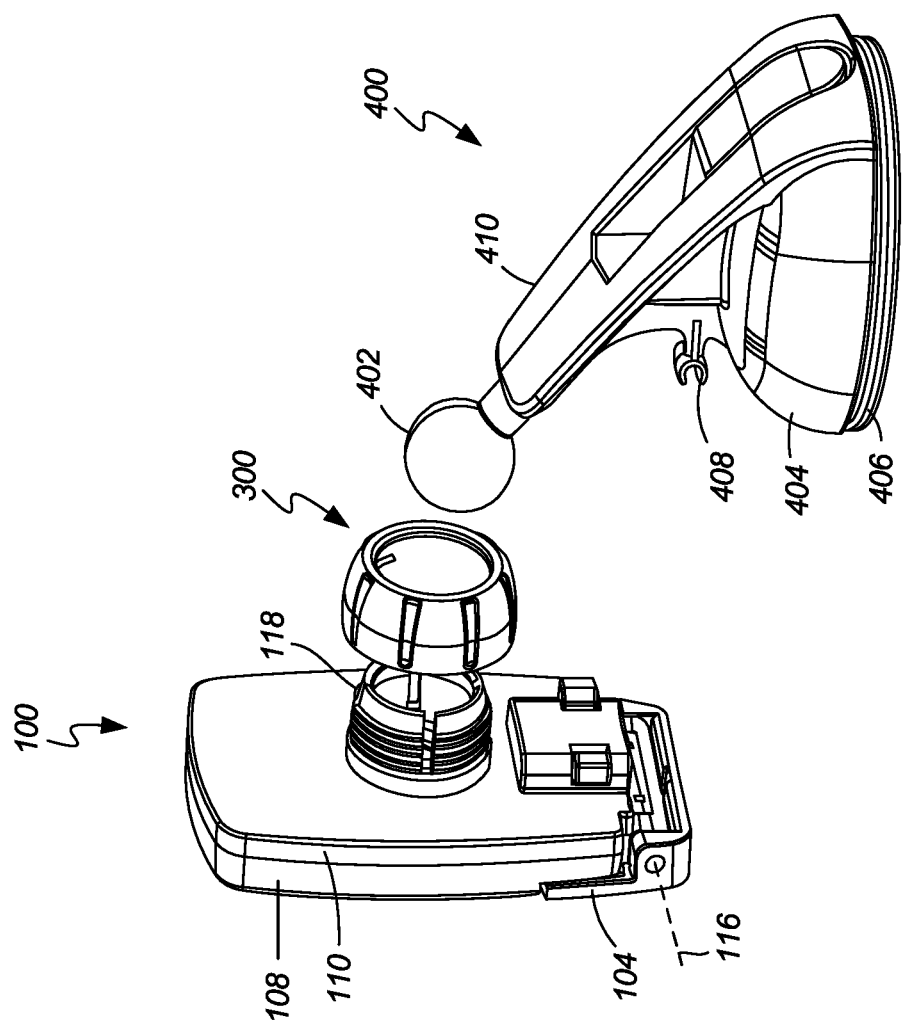
FIG. 14 is a perspective view of a mount body such as the mount of FIG. 1 and its connection to a dash base.

FIG. 14 shows an assembly of a mount body 100 to a dash base 400, in which ball 402 of dash base 400 engages socket 118 of mount body 100, allowing a secure yet movable connection between the mount body 100 and the dash base 400. A threaded cap 300 engages threads on the socket 118 to more securely mount mount body 100 to dash base 400.

An electronic device 500 is shown in perspective in FIG. 15, with a ferromagnetic plate 502 secured thereon. The ferromagnetic plate 502 is also shown not secured to the device 500. A device case 504 is also shown. Device case 504 may be used with embodiments of the present disclosure to cover ferromagnetic plate 502 so that it cannot be seen when a user is using their device 500. The case 504 being situated between the ferromagnetic plate 502 and a magnet such as magnet 112 of mount body 100, reduces the amount of magnetic force between the mount body 100 and the ferromagnetic plate 502. An electronic device 600 is shown in FIG. 16. In contrast to the electronic device 500 shown in FIG. 15, electronic device 600 has a removable back, and is comprised in part of a back plate 602 and a front plate 604. When back plate 602 is removed a ferromagnetic plate such as plate 502 may be inserted into an interior of electronic device 600, such as by securing plate 502 to an inner surface of back plate 604. The device 600 is re-assembled. The back plate 602 being situated between the ferromagnetic plate 502 and a magnet such as magnet 112 of mount body 100, reduces the amount of magnetic force between the mount body 100 and the ferromagnetic plate 502.

FIGS. 17 and 18 show, respectively, a mounting process for mounting a device such as device 500 to a mount body 100, with FIG. 17 showing a vent base 200 for the mount body 100, and FIG. 18 showing a dash base 400 for the mount body 100. It should be understood that a device such as device 600 is mountable to the mount body in the same way as device 500 is mounted to the mount body.

In each of FIGS. 17 and 18, a device 500 having a case 504, and a ferromagnetic plate 502 (not shown) is brought near to mount body 100, such as along a path like arrow 700, and the magnet 112 behind magnet cover 106 exerts a magnetic force on ferromagnetic plate 502 to assist in holding the device 500 to the mount body 100. As the magnet is further away from the ferromagnetic plate, and as there is intervening material (the case, or in device 600, the back plate 604) which attenuates the attraction between the plate 502 and the magnet 112, large devices or heavy devices may not be held with sufficient magnetic force to the mount body. If the device, such as device 500 or 600, is too large for support by the magnet and ferromagnetic plate alone, foldable, extendible legs 104 may be moved in such a configuration from their stored position to their supporting position, the movement indicated by arrows 702, and also may be extended using leg extension assembly 114.

Although only legs 104 are shown, it should be understood that additional supports such as lateral supports may be added to the mount body without departing from the scope of the disclosure.

In combination, embodiments of the present disclosure may include a mount body such as mount body 100, a ferromagnetic element such as plate 502, together and/or in with one or more of a vent base and a dash base as described herein.

In operation, mounting an electronic device such as a device 500 or 600 to a mount body is accomplished as follows. A ferromagnetic plate such as plate 502 is attached to an electronic device, or is sandwiched between a back of an electronic device and a case for the device, or is inserted into an interior of the electronic device, such as inside a rear cover of the device. The electronic device is brought into proximity with a body mount such as mount body 100, and a magnet of the mount body attracts the ferromagnetic plate. Legs, such as legs 104 on mount body 100, may be moved from their stored position to their supporting position, and adjusted with leg extension device to properly place the ferromagnetic plate in the closest proximity to the magnet, or to support the electronic device in a desired position, providing additional support to the electronic device.

It should be understood that some electronic devices have metallic or ferromagnetic back covers already. In such devices, a mount body such as mount body 100 may be used without the ferromagnetic plate 502, providing magnetic force between its magnet and the metallic cover of the device, along with additional support from legs such as legs 104. Also, a ferromagnetic plate such as plate 502 may be used as well.

What is claimed is:

1. A mount for an electronic device, comprising:
    a ferromagnetic element shaped and configured to be positionable inside a cover of the electronic device; and
    a mount body, the mount body comprising a magnet, a face plate, and at least one leg, the magnet secured in the face plate, and the at least one leg movable with respect to the mount body from a stored position to a support position, wherein the at least one leg is configured to directly support the device;
    wherein the at least one leg is adjustably extendible from the mount body; and
    wherein the at least one leg is extendible from the mount body in a direction coplanar with the face plate, and is foldable between the stored position and the support position, the support position being substantially normal to the face plate.

2. The mount of claim 1, wherein the magnet is covered by a magnet cover, and the magnet, magnet cover, and the at least one leg are positioned and/or mounted within the mount body.

3. A mount for an electronic device comprising:
    a ferromagnetic element shaped and configured to be positionable inside a cover of the electronic device; and
    a mount body, the mount body comprising a magnet, a face plate, and at least one leg, the magnet secured in the face plate, and the at least one leg movable with respect to the mount body from a stored position to a support position, wherein the at least one leg is configured to directly support the device;
    wherein the at least one leg further comprises a pair of leg extensions rotatably mounted to the leg, the pair of leg extensions rotatable between the first position and the second position to form a support for the electronic device.

4. The mount of claim 3, wherein the at least one leg is adjustably extendible from the mount body substantially parallel to the face plate.

5. The mount of claim 4, wherein the at least one leg is foldable between the stored position and the support position, the support position being substantially normal to the face plate.

6. A mount for an electronic device, comprising:
    a mount body comprising:
        a back plate;
        a front plate connectable with the back plate to form the mount body, the front plate having a face with a through opening therein;
        a magnet positioned in the through opening;
        a magnet cover covering the magnet; and
        at least one leg coupled to the front plate, the at least one leg movable relative to the front plate from a stored position coplanar with the face to a support position substantially perpendicular to the face; and
    a ferromagnetic element positionable within an electronic device, wherein the ferromagnetic element is positioned within the electronic device such that the body of the electronic device is between the ferromagnetic plate and the mount body.

7. The mount of claim 6, and further comprising a face plate covering the magnet cover and the front plate.

8. The mount of claim 6, wherein the at least one leg comprises a distal, extendible, foldable leg extension, the leg extension is extendible substantially coplanar to the mount face, and wherein the at least one leg extension is foldable at a distal position to the front plate from the first position to the second position.

9. The mount of claim 8, wherein the foldable leg extension is rotatably connected to the leg extension, and the leg extension extendibly mounted to the housing and extendible between a first position in which the leg extension is adjacent the housing and a second position in which the leg extension is separated from the housing.

\* \* \* \* \*